(12) United States Patent
Janus et al.

(10) Patent No.: US 6,839,498 B2
(45) Date of Patent: Jan. 4, 2005

(54) OPTICAL FIBER CABLE SWIVEL FOR FIBER OPTIC DISTRIBUTION FRAMES

(75) Inventors: Neal A. Janus, Parsippany, NJ (US); William J. Parzygnat, Morris Township, Morris County, NJ (US); Anthony Pellegrino, Gladstone, NJ (US); Randy A. Reagan, Morris Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 364 days.

(21) Appl. No.: 09/813,615

(22) Filed: Mar. 21, 2001

(65) Prior Publication Data

US 2002/0136520 A1 Sep. 26, 2002

(51) Int. Cl.[7] ................................................. G02B 6/36
(52) U.S. Cl. ..................................................... 385/134
(58) Field of Search ......................... 385/134, 135–139, 385/65, 83

(56) References Cited

U.S. PATENT DOCUMENTS

| 5,511,144 A | | 4/1996 | Hawkins et al. |
| 5,774,617 A | | 6/1998 | Stockman et al. |
| 6,061,492 A | * | 5/2000 | Strause et al. ............... 385/135 |
| 6,411,766 B1 | * | 6/2002 | Bechamps et al. .......... 385/134 |

* cited by examiner

*Primary Examiner*—Khiem Nguyen

(57) ABSTRACT

A cable swivel is provided for maintaining optical fiber bend limits at entry portals of a optic fiber shelf for the shelf's entire range of motion, from being fully closed to being fully open. Bend limits are maintained as optical fiber is directed on paths through a shelf entry portal between the shelf interior and wire brackets on the shelf exterior. Fibers are retained, organized and strain relieved by the cable swivel such that directed fiber is maintain at a minimum bend radius on such fiber paths. The curved surface of the cable swivel allows the shelf to be accessed without excessive bending of so routed optical fibers. In this manner, optical signal degradation and/or total loss is avoided by limiting the bending of routed optical fiber to radii in excess of a predetermined minimum bend radius.

8 Claims, 5 Drawing Sheets

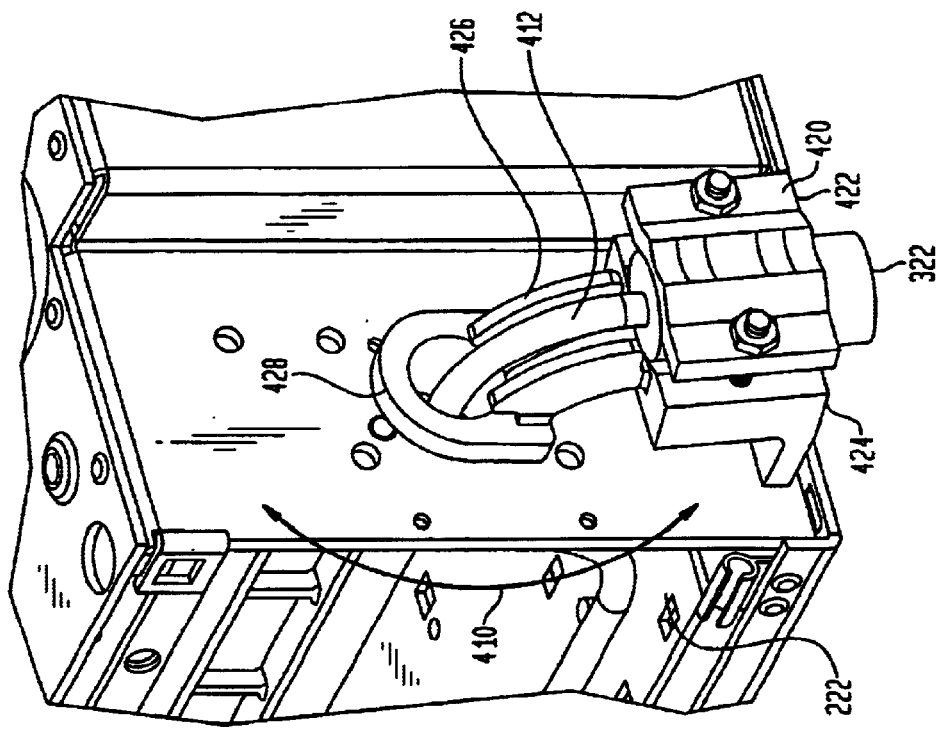
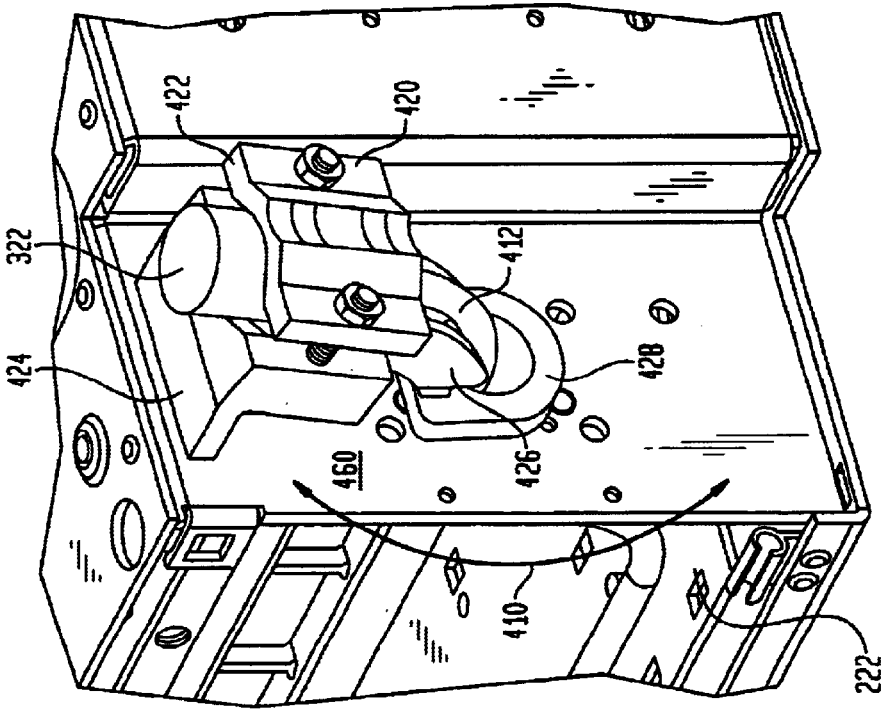

OPTICAL FIBER CABLE SWIVEL FOR FIBER OPTIC DISTRIBUTION FRAMES

FIELD OF THE INVENTION

The invention relates generally to fiber optic cable routing systems and more particularly to arrangements for routing optical fiber without violating the minimum bend radius for the fiber.

BACKGROUND OF THE INVENTION

Many transmission systems utilize an optical fiber network of interconnected optical fiber cables to enable optical communications between network locations. Typically, an optical fiber cable consists of a plurality of optical fibers surrounded by a protective sheath. Individual optical fibers consist of a small diameter core of low-loss material such as glass or plastic surrounded by a protective cladding that has a slightly lower index of refraction than the core. As is well known, a fiber optic cable operates to guide transmitted light pulses over distances with small pulse attenuation (i.e., low signal loss).

Due to the fragile nature of today's commercial fiber, there is a need to protect the fiber from external sources of stress, such as bending, pressure and strain, which can damage the fiber and/or cause degradation of the signal being transmitted via the fiber. For example, a fiber should not be bent sharply anywhere along its path. In addition to the possibility of breakage or fracture, if a fiber is bent past a critical angle, portions of transmitted light pulses will leak out, rather than being reflected within the fiber core, thereby attenuating the transmitted light pulses and degrading signal quality. Accordingly, it is necessary that a fiber be routed so that bends in the fiber be of a sufficient radius to substantially avoid occurrence of such light leakage.

The radius below which a fiber should not be bent to avoid light ray leakage is characterized as the minimum bend radius. Typically, the minimum bend radius varies with fiber design. However, in all fiber designs, bending the fiber with a radius smaller than its minimum bend radius may result in increased signal attenuation and/or a broken fiber.

Ordinarily, a unique fiber routing will be required to transmit light pulses between network locations. Over this unique route, light pulses may be propagated across several different fibers. At each transition from one fiber to another, individual fibers are connected, thereby enabling light pulses to be carried between a first fiber and a second fiber. In many cases, such as at a central office for the communications system, large numbers of fiber connections must be made and a fiber administration system is employed to manage the various connections.

In many fiber administration systems, as the optical fibers in a network enter the central office, they are directed into a fiber distribution frame where the individual optical fibers are terminated in an organized manner. Such fiber administration systems are exemplified by the LGX® Fiber Administration System that is currently manufactured by Lucent Technologies of Murray Hill, N.J., the assignee herein.

A fiber distribution frame typically provides an equipment rack housing a column of spaced apart shelves and/or horizontally slideable drawers for distributing a large number of fibers. Each shelf and/or drawer has an enclosed chamber with an aperture through which fiber cabling may pass. Fiber connections are fashioned within the enclosed chamber of the shelf. In a typical application, the frame serves as an interface between central office switching equipment and a network of transmission lines terminated at the central office.

Pre-terminated fiber shelves provide a convenient means of installing fiber cable connections at a network location. Such shelves are equipped with optical connectors that have been assembled onto the end of a fiber cable stub (i.e., a short length of fiber cable). Although fiber cable specifications normally require that the fiber cable not be bent in diameters smaller than 20× the cable diameter, if the fiber cable sheath is removed, individual fibers can be bent, or coiled, to smaller diameters. This permits the routing of a given number of fiber cables in a smaller area of a distribution frame. For this reason, the end of the fiber cable stub, which enters the shelf, are typically unsheathed. The fiber connections for a pre-terminated shelf are also fashioned during manufacture of the shelf, so that no field connectorization is required during installation.

Because of the delicate nature of unsheathed fibers and the need to maintain fiber bend limits for fibers transitioning to connectors in a shelf, the stub must be securely fastened to the shelf during manufacture. The stub may be fastened to provide either a top entry direction or a bottom entry direction. After manufacture, it is not desirable to loosen the stub from the shelf or to attempt to reconfigure the entry direction of the stub, for example, during installation of a shelf. Because the stiffness of fiber cable and the bend radius constraints associated with fibers, such reconfiguration attempts are prone to craft errors that could significantly damage the stub and/or fibers. At best, special care is required to reconfigure stub entry direction without exceeding fiber bend limits or breaking fibers.

Often, the specific fiber cable routing for a network location is not determined prior to set-up of the location. Consequently, the desired stub entry direction for shelves to be installed at the location is also not known. For this reason, and for manufacturing efficiency, shelves are typically manufactured as configured only for a top stub entry direction. Thus, shelves configured for top stub entry are shipped to a network location regardless of the location requirement. This causes significant problems when the network location requires a shelf configured for bottom stub entry.

Since stub entry direction is not easily reconfigured, a typical work-around for altering stub entry direction is to route the stubs through a circuitous route up the opposite side of the distribution frame, and then to loop the stubs over the top of the frame back down the other side. However, this method requires an extra length of fiber cable for the circuitous loop. In a typical application where multiple shelves are installed in one frame, this circuitous looping is likely to result in cable congestion—there being twice as much fiber cable in the vertical area of the frame as there would be if the fiber cable route were restricted to a single side of the frame. Furthermore, the excess fiber cable may block the path of other fiber cables that are routed through the top of the frame. In addition, the stiffness of fiber cable makes it difficult to manage fiber cable loops within the width of the frame. Therefore, this work-around is only practical for use with cables that allow a tight bend radius.

SUMMARY OF THE INVENTION

A fiber cable swivel mechanism (hereafter usually characterized as a "cable swivel") according to the invention allows the direction of fiber cable entry into a preterminated fiber shelf to be easily reconfigured without unfastening the fiber cable from the shelf. The cable swivel has fiber protection and fiber guiding integrated into its design so as to prevent excessive fiber bending at the entry portal of a shelf. The cable swivel also automatically maintains fiber bend limits as the fiber cable entry direction is reconfigured.

To that end, a cable swivel is described that maintains bend limits for fibers at an entry portal of a shelf, for effecting a transition of a fiber from a shelf to a vertical raceway in a distribution frame (or vice versa). Accordingly, the cable swivel of the invention defines a surface with a radius of curvature greater than a predetermined minimum bend radius. Fibers routed across the curved surface of the cable swivel are thereby protected against exceeding the minimum bend radius of the fiber. A retaining member that holds the fiber cable in a vice holds the fiber cable in place on the cable swivel. Horizontal members join smaller sub-surfaces to form the curved surface of the cable swivel. The cable swivel is held in place in the shelf with a screw though a first section.

The cable swivel maintains fiber bend limits as the cable swivel is rotated to reconfigure the entry direction of the fiber cable. Outside a shelf, fibers may be routed for interconnection at other optical network equipment in the fiber distribution frame via a fiber routing system. Thus, the fiber cable entry direction of the shelf may be quickly and easily reconfigured, simplifying shelf installation when a bottom entry shelf is required.

BRIEF DESCRIPTION OF THE DRAWINGS

For a better understanding of the invention, reference is made to the following description of an exemplary embodiment thereof, considered in conjunction with the accompanying drawings, in which:

FIG. 3a depicts a shelf with a cable swivel configured for top fiber cable entry;

FIG. 3b depicts a shelf with a cable swivel configured for bottom fiber cable entry;

DETAILED DESCRIPTION OF THE DRAWINGS

There is described herein, illustrative and descriptive forms and embodiments of a shelf cable swivel according to the invention. As would be apparent to those skilled in the art, various changes using different configurations and functionally equivalent components may be made without departing from the scope of the invention. Thus, the invention is not considered limited to the particular illustrative embodiments shown in the specification and all such alternate embodiments are intended to be included in the scope of this invention.

Fiber Administration System

Figure 1:
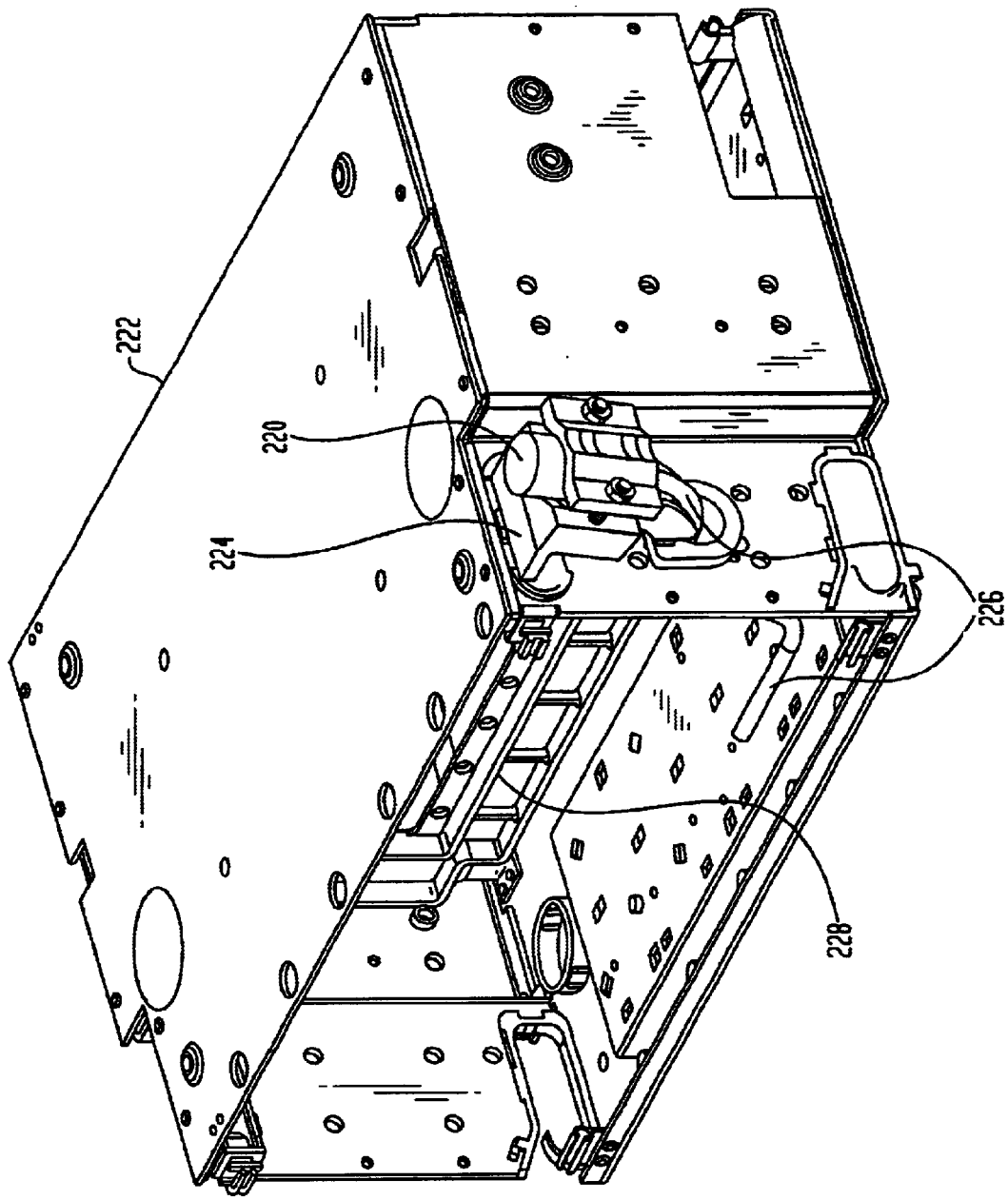
FIG. 1 depicts a conventional shelf configured for top fiber cable entry.

FIG. 1 depicts a conventional preterminated fiber shelf configured for top entry of a fiber cable stub. A stub 220 is directed toward the fiber cable shelf 222 from above. A bracket 224 attached to the shelf 222 provides a mounting point for the stub. The stub 220 may be secured to bracket 224 using a metal retention clamp and cable ties (not shown in detail). Individual optical fibers 226 are unsheathed from the stub and directed into the interior of the shelf. Within the shelf, fiber connection means 228 are provided to interconnect fibers. Fibers may be interconnected within the shelf via fusion or mechanical splices or fiber terminations. Other fiber connection means are possible and will be apparent to one skilled in the art.

Figure 2A:
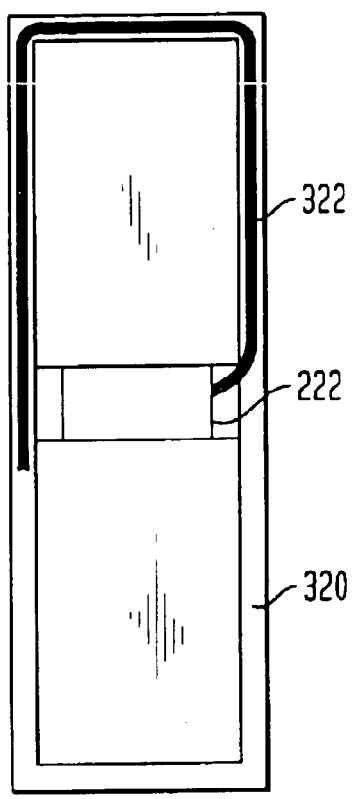
FIG. 2a depicts the typical fiber cable route in a conventional distribution frame when bottom fiber cable entry is desired.

FIG. 2(a) depicts the typical stub route in a conventional distribution frame when bottom stub entry is desired. Shelf 222 is affixed in a vertical column in a distribution frame 320. The design of the distribution frame allows easy addition of any number of shelves and expansion of an optical fiber network. The shelf 222, as typical for conventional shelves, is configured for top entry of stub 322. Stubs (and individual fibers) enter the shelf from the top direction, and as discussed above, the entry direction is not easily reconfigurable. Therefore, in order to route the stubs in a downward direction, the stubs 322 are routed in a circuitous loop up the side of the distribution frame, over the top of the frame and back down the opposite side of the frame.

Figure 2B:
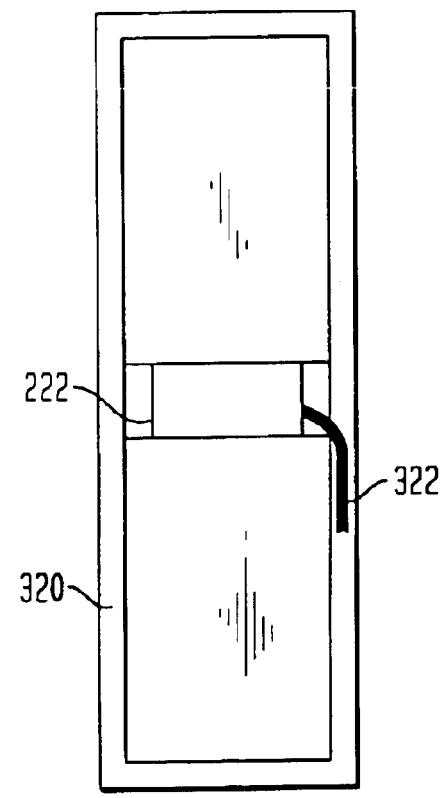
FIG. 2b depicts the fiber cable route possible when a shelf in a distribution frame is configured for bottom fiber cable entry utilizing the cable swivel according to the invention.

The fiber cable routing for bottom stub entry in a shelf utilizing the cable swivel of the invention is depicted FIG. 2b. The cable swivel allows stubs 322 to be directed in the downward direction without being routed in a circuitous loop. The cable swivel allows the shelf to be easily reconfigured so as to provide bottom stub entry (and thereby avoid the necessity of routing the stub in a circuitous loop).

Cable Swivel Deployed at Shelf Entry Portal:

A shelf may be configured for either top stub entry or bottom stub entry and is easily reconfigured using the cable swivel of the invention. FIG. 3a depicts a shelf with a cable swivel that is configured for top stub entry. FIG. 3b depicts the cable swivel rotated 180° from the positioning of FIG. 3a, and thus depicts a shelf with a cable swivel that is configured for bottom stub entry. Arrow 410 denotes that the cable swivel 420 may be rotated 180° to reconfigure the stub entry direction between top entry and bottom entry.

In FIG. 3a, a stub 322 is directed to the cable swivel 420 from a position above a shelf 222. The stub 322 is secured to the cable swivel between a stub connection plate 422 and stub channel portion 424 of the cable swivel (i.e., in a vice-like mechanism). Alternatively, the stub may be connected to the cable swivel utilizing a variety of means well known to a person skilled in the art of the invention. For example, the stub 322 may be secured to cable swivel using a metal retention clamp and/or cable ties. Once secured, fibers 412 are unsheathed from the stub and directed across a curved channel 426 of the cable swivel and through an inlet of the cable into the interior of the shelf.

Figure 3C:
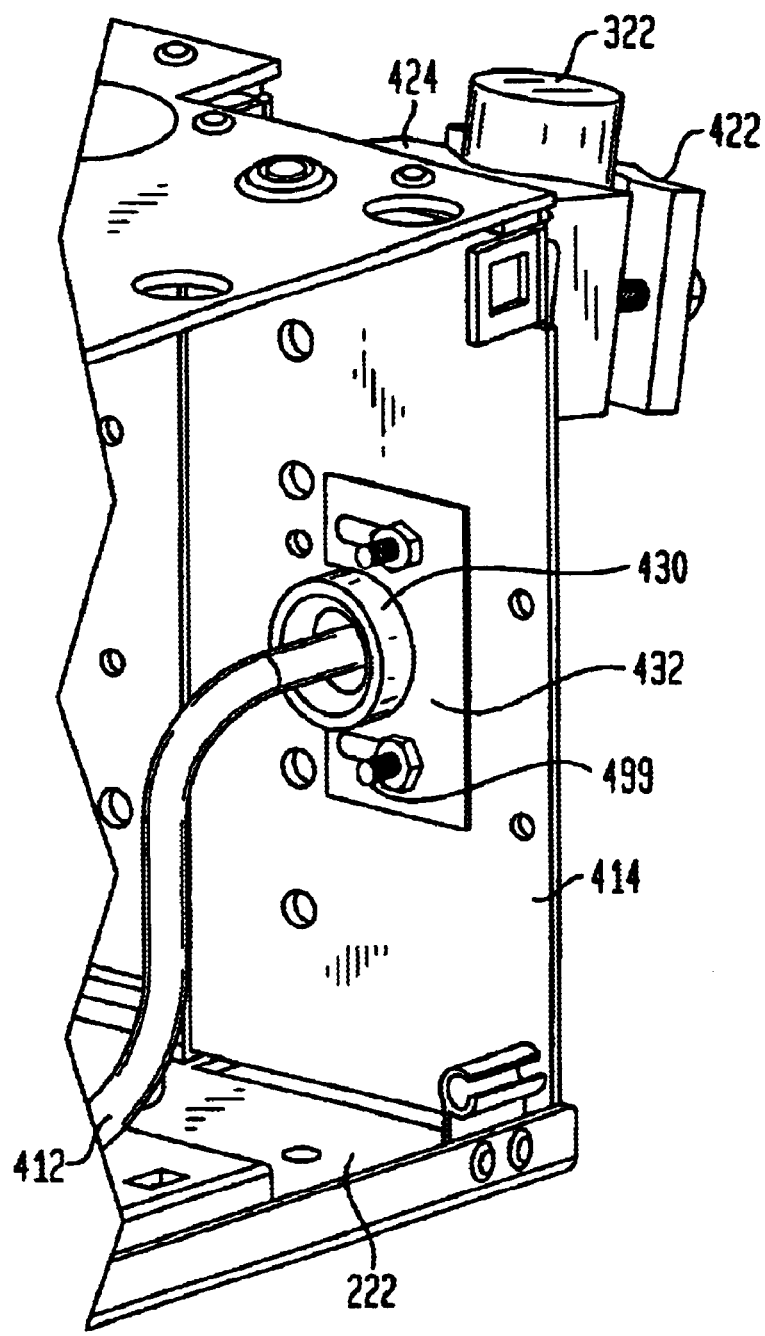
FIG. 3c depicts the interior of a shelf that has a cable swivel deployed.

FIG. 3c depicts the interior of a shelf that has a cable swivel deployed. The shelf has a sidewall 414 with an entry portal in which the cable swivel is positioned so as to maintain fiber bend limits as the fiber changes direction and is routed between the shelf interior and exterior.

Fibers 412 pass through a tubular portion 430 of the cable swivel into the shelf interior. A connection plate 432 slides into a groove (not shown) in the tubular portion 430 of the cable swivel and secured to a sidewall 414 of the shelf via bolts attached to the shelf interior. Various other attachment means besides a tongue and groove system are well known to those in the art and may be implemented to hold the cable swivel attached to the shelf. The shelf 222 provides an enclosed chamber into which fibers 412 pass for the fashioning of fiber connections (not shown). In the shelf chamber, fibers are interconnected while being routed and stored in compliance with fiber bend limits via various methods well known to those skilled in the art of the invention. For example, fibers may be routed in observance of their bend limit to termination adapters mounted within the shelf for the fashioning of fiber terminations.

Cable Swivel

Figure 4A:
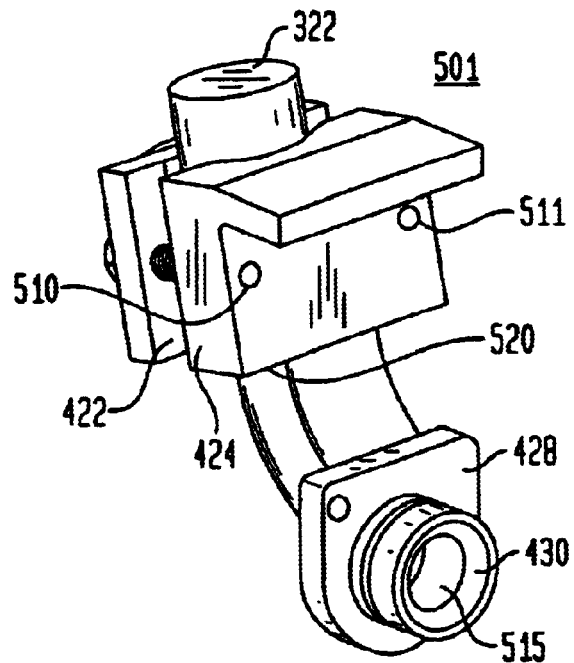
FIG. 4a depicts a perspective view of a cable swivel in accordance with the invention.
Figure 4B:
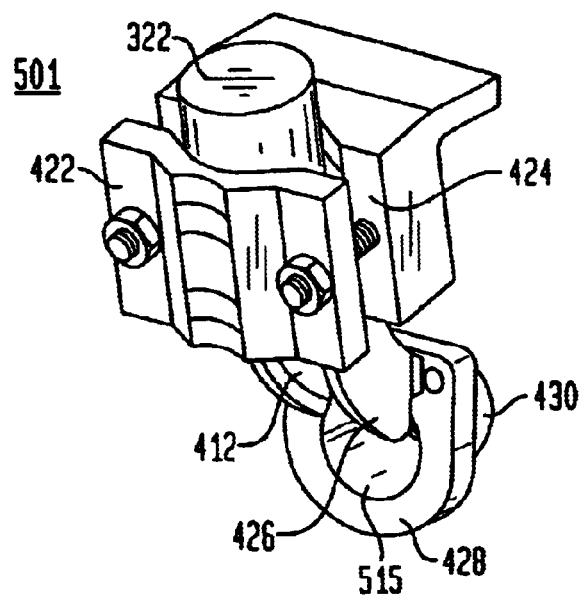
FIG. 4b depicts an alternative perspective view of a cable swivel in accordance with the invention.

Fibers and fiber connections routed in a shelf are ordinarily protected from signal degradation caused by excessive fiber stress and/or detrimental environmental conditions. However, a discontinuity arises at the entry portals of a shelf, where fibers are transitioned between the shelf interior and a raceway along the shelf exterior for routing to other optical network equipment. At an entry portal, in order to change fiber direction, the fibers must be bent. Without a system to protect the fibers at an entry portal, the fibers may be sharply bent in excess of the minimum bend radius. Furthermore, in order to reconfigure stub entry direction in a shelf, the stub may have to be handled with a range of motion. Therefore, in accordance with this invention, cable swivel 501 having a curved surface or channel 426 or over which fibers e.g. fibers 412 are routed is deployed at this position to ensure that the fibers follow a controlled bend and are not bent at radii in excess of the minimum bend radius. FIG. 4a and 4b depict alternative perspective views of an illustrative embodiment of a cable swivel 501 for a shelf entry portal in accordance with the invention.

The cable swivel is comprised of three contiguous segments—a fiber cable connection section (e.g. plate 422 and channel portion 424), a fiber direction section (e.g. curved channel 426), and a shelf entry portal section (e.g. tubular portion 430 and channel 428). The fiber cable connection section provides a shaped channel 426 in which fiber cable rests. It also has mounting holes 510 and 511 to which a connection or vise plate 422 connects to hold the fiber cable route therethrough in place. The cable swivel has a corresponding aperature 515.

Individual fibers may be broken out of fiber cable stub 322 after being secured to the fiber cable connection section. The fibers are then routed to shelf interior via the fiber direction section 426 of the cable swivel which maintains the routed fibers' minimum bend radius. The fiber direction section of the cable swivel maintains the minimum bend radius for fibers routed between the point at which the fibers are unsheathed from the stub and the interior of the shelf. Stubs may be directed along the distribution frame to other shelves and/or optical system equipment via a variety of means know to those skilled in the art of the invention.

Fibers (not shown) are directed across the first curved surface of the cable swivel. From this position, the fibers are directed across the curved surfaces of the cable swivel and out the shelf entry portals 515. Fibers are threaded through the cable swivel. In this manner, the cable swivel maintains fiber bend radii in excess of a minimum bend radius for all shelf opening angles.

As illustrated, a cable swivel has sub-surfaces that are joined to define a surface with a radius of curvature greater than a predetermined minimum bend radius—that minimum bend radius being selected to be equal to or greater than the critical bend radius of fibers to be routed therethrough. A first curved surface, a second curved surface, and a third curved surface join to form what can be described as the general outline of the curved outer surface of one-half of a cylinder. Fibers are directed over the surface formed by the curved sub-surfaces in order to maintain bend limits at the entry portals of a shelf. Typically, the minimum bend radius is a variable in fiber design and so, the curvature of a cable swivel may be modified for use with various fibers.

The curved sub-surfaces of channel 426 are attached to a first end of horizontal members 520. In the exemplary embodiment, two exterior horizontal members and an interior horizontal member join the curved sub-surfaces of the cable swivel. The horizontal members unite the curved sub-surfaces of the cable swivel together into a single rigid unit. The horizontal members also serve to compartmentalize the cable swivel into channels, enabling fibers to be separated so that all the routed fibers do not pile up in a single area of the cable swivel.

The width of the extension member on the stub connection portion 422 of the cable swivel acts to offset the cable swivel from the sidewall e.g. 460 of the shelf which is best viewed in FIG. 3a. The sidewalls of the channel section of the cable swivel provide depth to the channels in which fibers are routed, holding fibers in place and away from sidewalls 400. Vertical retaining strips may be added to retain fibers in place in the channels of the cable swivel, as the cable swivel is moved during reconfiguration of stub entry direction. The vertical retaining strips (not shown) may be provided with fiber access slot to allow for push-through wiring access, eliminating the need to feed fibers through an aperture in the channel portion of the cable swivel.

Referring now to FIG. 3c, the mounting plate 432 passes over peg members 499 attached to the interior of the shelf sidewall 414. The mounting plate then slides into a groove in the outer circumference of the cable swivel 430. When the mounting plate is fastened to the shelf sidewall, the swivel may not be removed from the sidewall. In a preferred embodiment, the cable swivel slides into an entry portal and snaps into position. Various alternative means of securing the cable swivel to the shelf will be apparent to those skilled in the art of the invention. For instance, the cable swivel may be bonded to a surface near the shelf entry portals.

There has been described and illustrated herein, a cable swivel that maintains bend limits for fiber at entry portals of shelves. The cable swivel collects fibers unsheathed from a stub securely fastened to the cable swivel. Fibers routed across a cable swivel are protected from excessive bending as the fiber transition between a vertical raceway alongside a distribution frame and the shelf of the frame. The cable swivel of the invention protects fibers from excessive bending thus avoiding optical signal degradation and/or total signal loss on fibers routed in an optical fiber network. The cable swivel also allow the entry direction of the fiber to be reconfigured between top stub entry and bottom stub entry without requiring unfastening of the cable from the cable swivel.

It is to be understood that the invention is not limited to the illustrated and described forms and embodiments contained herein. It will be apparent to those skilled in the art that various changes using different configurations and functionally equivalent components may be made without departing from the scope of the invention. Thus, the invention is not considered limited to what is shown in the drawings and described in the specification and all such alternate embodiments are intended to be included in the scope of this invention as set forth in the following claims.

What is claimed is:

1. A device for flexibly routing and securing optical fibers in compliance with a predetermined minimum bend radius, said device comprising:

a plurality of cooperating and contiguous surfaces;

a horizontal member joining said surfaces, said horizontal member separating said plurality of surfaces into functionally different compartments, and at least one of said plurality of surfaces forming a curved surface having a radius of curvature greater than a predetermined minimum bend radius; and a clamping means disposed to secure said optical fibers proximate to said curved surface as routing of said fibers is changed from a first direction to a second direction.

2. A device for directing an optical fiber through an entry portal of a shelf from the interior of said shelf to a raceway extending from the exterior of said shelf while maintaining a predetermined minimum fiber bend radius, comprising:

a plurality of contiguous and cooperating sub-surfaces including a horizontal member interconnecting said sub-surfaces;

at least one of said subsurfaces having a radius of curvature greater than a predetermined minimum bend radius situated to guide said fiber and restrict said fiber to a predetermined bend radius; and a clamping means disposed to secure said optical fiber proximate to said plurality of contiguous and cooperating sub-surfaces as routing of said fibers changed from a first direction to a second direction.

3. The invention set forth in claim 2 wherein another of said subsurfaces includes a fiber access slot forming an entry portal for fibers communicating between the interior and exterior of said shelf.

4. The invention set forth in claim 3 wherein said surface containing said access slot additionally incorporates a shelf securement arrangement for orienting said device in a first position, or in a second position which is 180° out of phase to accommodate top and bottom cable routing and securement.

5. A cable swivel device for routing optical fiber through an entry portal of a fiber optic shelf, said cable swivel device maintaining predetermined fiber bend limits as said optical fiber directed in a first direction is redirected in a second direction substantially different from said first direction, the cable swivel comprising:

a plurality of sub-surfaces;

a clamping means disposed relative to said plurality of surfaces; and a horizontal member connected to said plurality of sub-surfaces to form a curved surface having a radius of curvature greater than a predetermined minimum bend radius, said curved surface maintaining a consistent pathway for said optical fiber along said radius of curvature when said fiber is routed in said first direction and said second direction.

6. The invention set forth in claim 5 further including a shelf entry portal in another one of said sub-surfaces to furnish routing access between an exterior and interior surface of shelf.

7. The invention set forth in claim 6 wherein said shelf interior wall contains peg members, and said sub-surface having said portal cooperates with said peg members to locate the device relative to said shelf.

8. The invention set forth in claim 7 wherein the said peg members and sub-surface cooperate to provide securement in two positions which are 180° relatively apart.

* * * * *